United States Patent
Hiney

[15] 3,680,413
[45] Aug. 1, 1972

[54] LATHE

[72] Inventor: Leonard L. Hiney, Austintown, Ohio

[73] Assignee: Wm. K. Stamets Company, Columbiana, Ohio

[22] Filed: Dec. 14, 1970

[21] Appl. No.: 97,621

[52] U.S. Cl. ....................................82/2.5, 82/2.7
[51] Int. Cl. ...............................................B23b 13/02
[58] Field of Search..................................82/2.5, 2.7

[56] References Cited

UNITED STATES PATENTS

| | | | |
|---|---|---|---|
| 2,747,450 | 5/1956 | Tabet | 82/2.5 |
| 2,422,964 | 6/1947 | Hibbard | 82/2.5 X |
| 2,249,148 | 7/1941 | Lovely et al. | 82/2.5 |

*Primary Examiner*—Leonidas Vlachos
*Attorney*—Oberlin, Maky, Donnelly & Renner

[57] ABSTRACT

A lathe having a tailstock with a cradle for loading and unloading work swingably mounted thereon and movable axially from a transfer position to the machining position where the work is chucked in the lathe and the cradle swung out of the way. Work is fed to the cradle at the transfer position from a roller conveyor by horizontal beams which lift the work and move it transversely of the lathe to intermediate stations and finally into the cradle. After machining of the work the cradle carries it to the transfer position and swings upwardly so that the work rolls transversely to another position after which it is moved to a work station and the exit conveyor.

9 Claims, 6 Drawing Figures

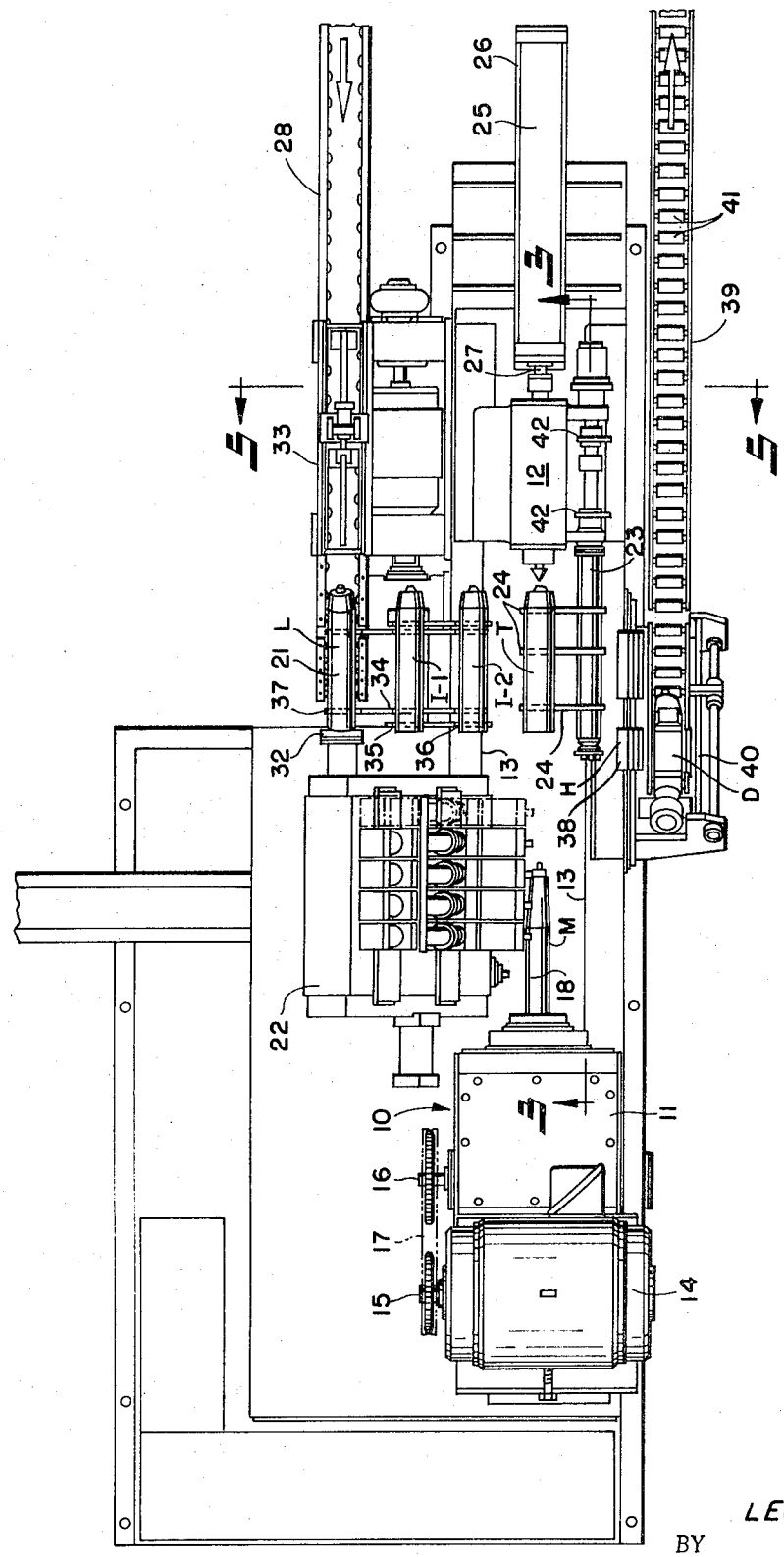

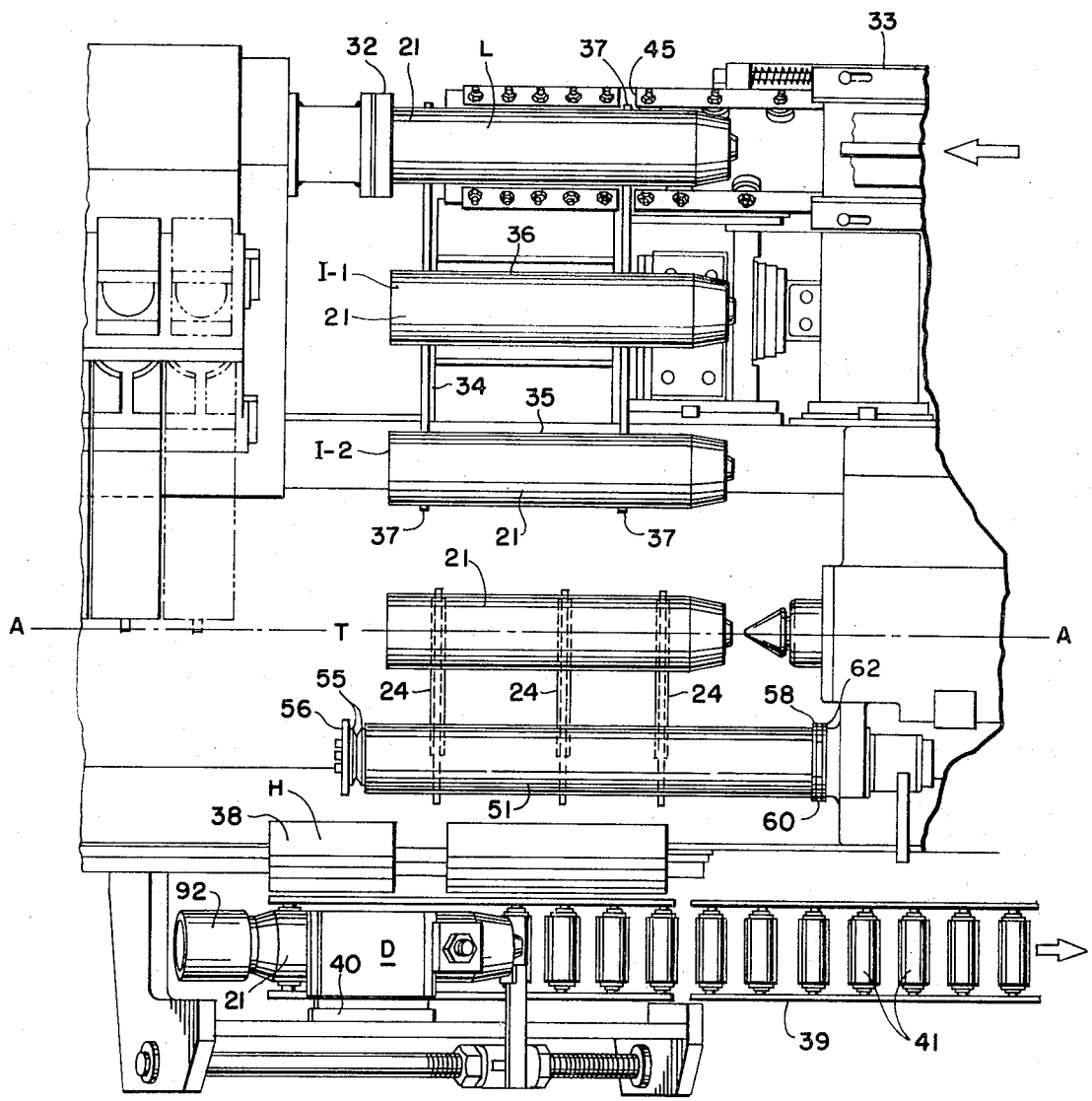

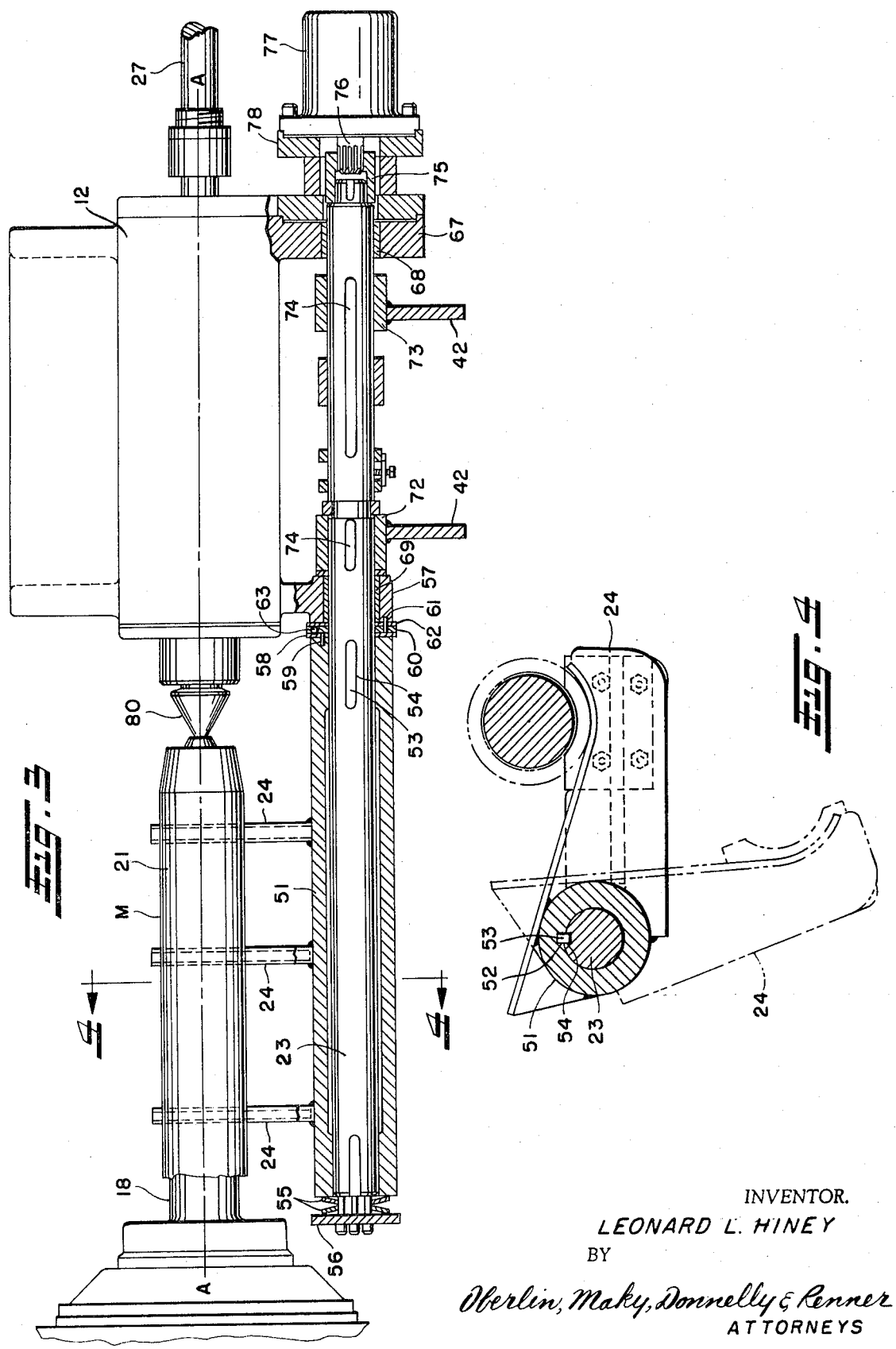

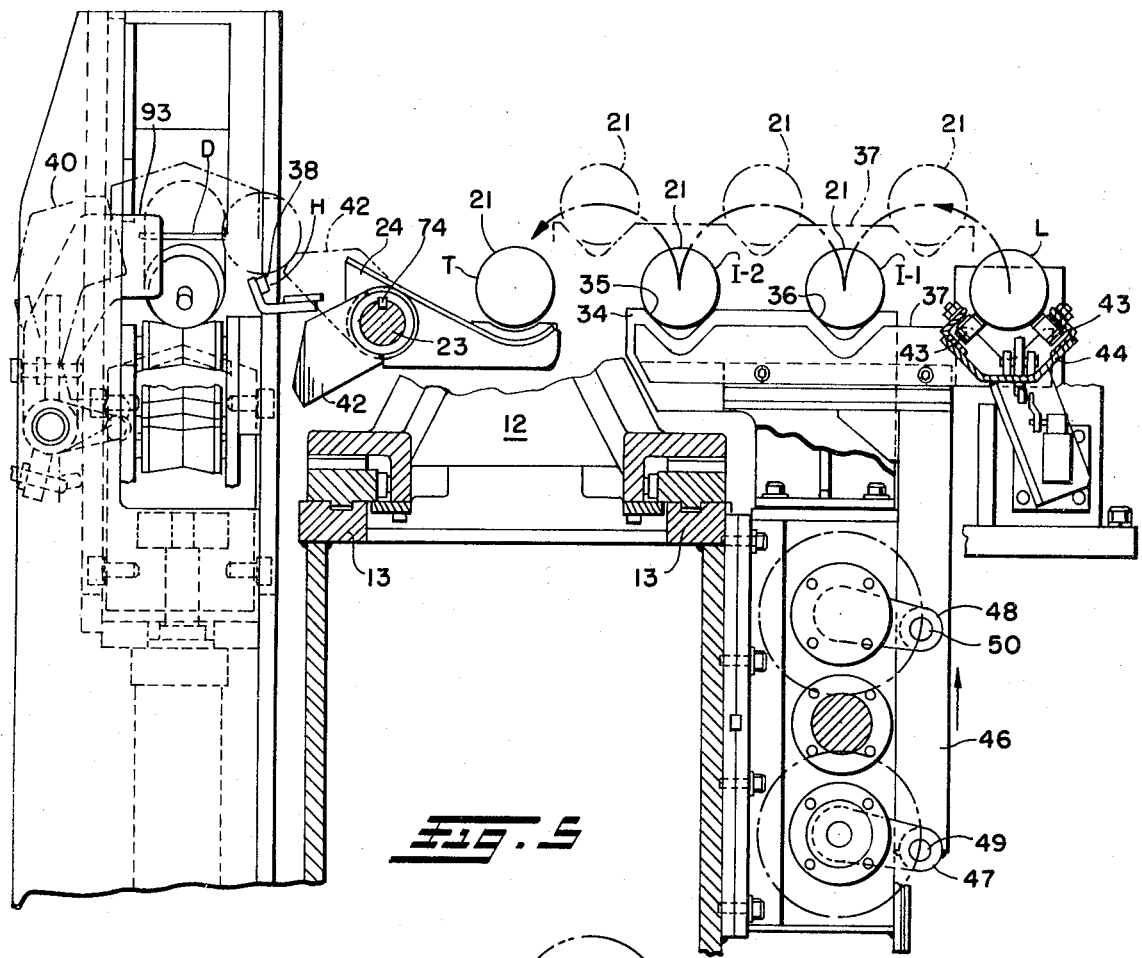
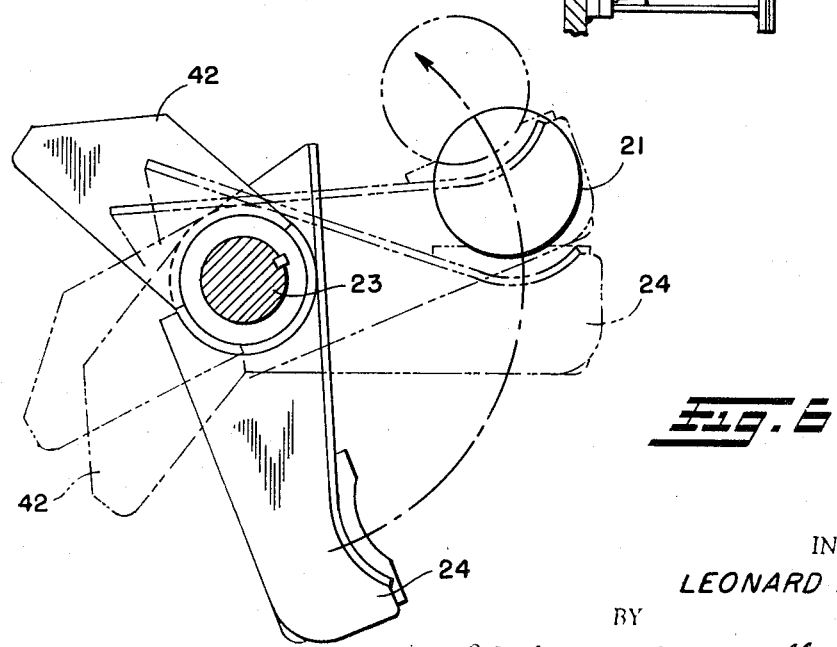

LATHE

In the manufacture of shell casings and other metal pieces where repetitive machining on a lathe is required a considerable amount of time is lost in the loading, setting up and unloading of the work on the lathe. With the high speed cutting tools and heavy duty lathes which are now being used this time loss becomes even more critical. This can be appreciated when one compares the feeds and speeds of cutting metal which are now possible with the feeds and speeds which were normal of few years ago. It is also true that the cost of these high speed precision machines and cutting tools are substantially higher as is the labor cost to operate them.

Although the problem is more critical today efforts have been made throughout a span of many years to provide loading and unloading aids to reduce the time required for these operations. For example, in the patent of R. L. Hibbard U.S. Pat. No. 2,422,964 a lathe is shown in which a roller conveyor carries a shell case to the front of the lathe and elevator arms actuated by a foot treadle assist in moving the casing into position where it can be chucked in the lathe. This was a labor-saving device and did save some time; however, it still required the careful attention of an operator and placed the conveyor in a position obstructing access to the lathe for servicing and adjustment of the tools and other operating parts. There was also no provision for feeding the pieces to the lathe in an orderly fashion or means for removing the machined casings on a different conveyor.

In the present invention the loading and setup as well as the unloading is completely automatic and therefore no time is lost because the operator fails to do his or her job.

It is another object of this invention to provide for moving the work into machining position by using the tailstock carriage and guideways which are already an integral part of a lathe.

A further object of this invention is to provide a work supporting cradle which is swingable out of the way during the machining operation and may also be swingable to a position where the work is rolled to the next position and then lifted to another station or onto another conveyor.

A still further object is to provide for loading and unloading the work on an expandable mandrel.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the drawings:

FIG. 1 is a plan view of a lathe showing the loading and unloading apparatus.

FIG. 2 is an enlarged fragmentary view like FIG. 1 showing the work handling apparatus in greater detail.

FIG. 3 is an enlarged fragmentary sectional view taken along the plane of line 3—3 of FIG. 1 showing the swinging cradle and tailstock housing with the work in the loaded position.

FIG. 4 is an enlarged sectional view of the cradle arms taken along the plane of line 4—4 of FIG. 3 showing the work supporting position in full lines and the retracted position in phantom lines.

FIG. 5 is a fragmentary sectional view taken along the plane of line 5—5 of FIG. 1, parts being broken away, to show the positions of the work as it is moved across the apparatus with intermediate positions being shown in phantom lines.

FIG. 6 is an enlarged fragmentary sectional view like FIG. 5 of a cradle arm in the retracted position and showing the supporting position and unloading positions in phantom lines.

Referring now in detail to the drawings, a lathe 10 is shown in FIG. 1 which has a headstock 11 and a tailstock 12 mounted for sliding movement on guideways 13 in the axial direction of the lathe. A drive motor 14 is mounted adjacent the headstock 11 and has a driving shaft 15 connected to a driven shaft 16 of the headstock by steel chain 17 engaging sprockets mounted on the driving shaft 15 and driven shaft 16.

The headstock 11 has a spindle drive connected by suitable drive gears to the driven shaft 16 and carries a chucking mechanism for holding the work during machining and which in this embodiment is an expandable mandrel 18 for insertion in shell casing 21. A multiple head cutter assembly 22 is mounted alongside the mandrel 18 for radial and axial movement of the cutters to automatically machine the casing 21 turning on the mandrel 18 in a manner well understood in the art.

The tailstock 12 has a shaft 23 mounted on the side thereof and extending towards the headstock 11 at a position spaced from the axis of rotation of the lathe 10. A work supporting member such as a cradle made up of cradle arms 24 extending below the axis of rotation of the lathe 10 is mounted on the shaft 23.

A piston cylinder assembly 25 having a stationary cylinder 26 and a movable piston rod 27 connected to the tailstock 12 is located at the opposite end of the lathe 10 from the headstock 11. The piston cylinder assembly 25 moves the tailstock 12 and the cradle arms 24 on shaft 23 from a transfer position T with a casing 21 supported by the arms 24 to a machining position M where the casing is carried over the mandrel 18 and chucked up in the lathe 10.

Casings 21 are carried to the lathe 10 by a gravity roller conveyor such as loader conveyor 28. At the end of the conveyor 28, a casing 21 is held in a loading position L by a stop 32. Upstream of the loading position L is a feeding mechanism 33 of a type well understood by persons skilled in the art for stopping the movement of the casings 21 along the conveyor 28 and feeding them one at a time to the loading position L.

Between the loading position L and the transfer position T is a rack 34 having V-shaped grooves 35 and 36 for holding the casing 21 in intermediate positions I-1 and I-2. A walking beam 37 which moves transversely of the lathe 10 carries the casing 21 from position L to intermediate position I-1, to intermediate position I-2 and then to the transfer position T.

After the casing 21 has been machined and returned to the transfer position T the shaft 23 is rotated to lift the cradle arms 24 to roll the machined casing onto a holder 38 mounted on the frame of a decapitator 40. The casing 21 remains in this hold position H while the cradle arms 24 return to a horizontal position for receiving a casing 21 from intermediate position I-2. The casing 21 is then moved to the machining position M on the cradle arms 24 which move with the tailstock 12 axially towards the headstock 11. The casing 21 is chucked on the expandable mandrel 18 and the cradle arms 24 are lowered out of engagement with the casing by rotating the shaft 23. As the shaft 23 is rotated it moves lift arms 42 mounted on the shaft at a position alongside the tailstock 12 upwardly into engagement with the casing 21 lifting it into the decapitator position D in the decapitator mechanism 40 of a type understood and known to those skilled in the art. The casing 21 is then carried away on the unloader conveyor 39 having rollers 41 and being tilted away from the lathe 10 so that the casing will roll away by gravity.

Referring to FIGS. 2 and 5, the shell handling apparatus is shown in more detail. At the loading position L, the shell casing 21 is supported by rollers 43 mounted on a V-shaped bracket 44 so that the rollers are inclined and disposed radially of the shell casing holding it in a fixed position against the stop 32. The bracket 44 has a slot 45 extending transversely of the roller conveyor 28 to accommodate a walking beam 37 which extends horizontally under the shell casings 21 in loading position L, intermediate position I-1 and intermediate position I-2 as shown in FIG. 5 in full lines. This walking beam 37 and a parallel walking beam 37 located in the space beyond the end of the loader conveyor 28 are mounted on a supporting structure such as vertical frame 46 which is pivotally connected to parallel crank arms 47 and 48 so that the pivotal pins 49 and 50 move in paths indicated by the dot-dash lines in FIG. 5 causing the frame to move upward as indicated by the arrow and the shell casings 21 to move transversely to the left as indicated by the arrows and by the dot-dash lines. The positions of the shell casings 21 and walking beams 37 at the mid position are shown in dot-dash lines. In this manner the shell casings 21 are moved to the left as shown in FIG. 5 upon each revolution of the arms 47 and 48. The arms 47 and 48 may be rotated by suitable power means controlled and responsive to the transfer of the shell casings 21 from one position to another.

As shown in FIGS. 5 and 2, the cradle arms 24 extend from the shaft 23 in a generally horizontal position under the casing 21 in the transfer position T in which the casing is concentric with the axis of rotation A—A of the lathe 10. As shown in greater detail in FIG. 3, the cradle arms 24 are mounted securely as by welding on a sleeve 51 which slides over the end of the shaft 23 and has a keyway 52 for accommodating a key 53 which fits in a keyseat 54 in the shaft 23. At the end of shaft 23 are mounted spring compression washers 55 and a retaining plate 56 for urging the sleeve toward the rear end of the tailstock 12. Interposed between the sleeve 51 and the face of a lug 57 mounted on the forward end of tailstock 12 is a ball detent assembly, which may be more clearly seen in FIG. 3. A detent plate 58 is fixed as by pins 59 to rotate with the sleeve 51. A ball race 60 is fixed as by pins 61 to the lug 57. A thrust plate 62 is also fixed to lug 57 by pins 61 and steel balls 63 are held captive by the ball race 60. With the cradle arms 24 in the transfer position T the balls 63 are urged into detents in the detent plate 58 and thereby help maintain the arms in position.

A second lug 67 mounted on the rear end of the tailstock 12 also contains a bearing 68 in alignment with bearing 69 in the forward lug 57 for supporting the shaft 23 for rotation therein. Between the lugs 57 and 67, collars 72 and 73 are fixedly mounted on the shaft 23 as by keys 74. The collars 72 and 73 support the lift arms 42 which are fixedly mounted to the collars as by welding so that upon rotation of the shaft 23, the collars 72 and 73 and lift arms 42 will also rotate. As shown more specifically in FIG. 6, the lift arms 42 are tilted downwardly when the cradle arms 24 are in the transfer position T extending horizontally under the casing 21 and are tilted upwardly when the cradle arms 24 are retracted from the machining position M while the casing is being machined.

At the rear end of the tailstock 12, the shaft 23 extends through the second lug 67 and into a joint 75 attached to the shaft 76 of a hydraulic motor 77 or other suitable power means for turning the shaft 23. The hydraulic motor 77 is mounted on a housing 78 around the joint 75 which is also mounted on the second lug 67.

As shown in FIG. 3, the shell casing 21 has been carried over the mandrel 18 and chucked on the lathe 10 with the rotating center 80 of the tailstock 12 in engagement with the end of the casing. In this machining position M the multiple head cutter assembly 22 and the rotating spindle in headstock 11 provide a turning and machining of the casing 21 as soon as the cradle arms 24 are moved to the retracted position as shown in FIG. 4 in dot-dash lines.

As shown more clearly in FIGS. 2 and 5, the machined casing 21 has an end 92 which is removed by a blade 93 after which the casing 21 is permitted to roll by gravity on rollers 41 down the unloader conveyor 39. The decapitating mechanism 40 is understood and well known to those skilled in the art.

Although the specific controls for operating the apparatus embodying this invention are not shown, electric and hydraulic controls of a type known to those skilled in the art, are used to coordinate the handling of the casing 21 from the time that it enters the feeding mechanism 33 until the time it leaves the decapitating mechanism 40. These controls sense the presence of a casing 21 in the different positions on the apparatus and actuate the mechanism to process the casing. In accordance with the procedure set forth above, it can be seen that with this apparatus automatic feeding and machining of the casing is obtained to provide economies in manufacture and precision machining of the casing.

While certain representative embodiments and details have been shown for the purpose of illustrating the invention, it will be apparent to those skilled in the art that various changes and modifications may be made therein without departing from the spirit or scope of the invention.

I, therefore, particularly point out and distinctly claim as my invention:

1. A lathe comprising a headstock, a tailstock slidably mounted on guideways for axial movement toward and away from said headstock, a shaft rotatably supported on said tailstock and extending towards said headstock at a spaced-apart distance from the axis of rotation of the lathe, a work supporting member mounted on said shaft and extending below the axis of rotation of the lathe, means to move said tailstock axially of the lathe between a transfer position where said supporting member receives and ejects the work and a machining position where the work is chucked in the lathe and means for rotating said shaft to move said supporting member downward from a supporting position to a retracted position to permit rotation and machining of the work.

2. A lathe according to claim 1 wherein an expandable mandrel is mounted on said headstock and extends axially toward said tailstock housing for chucking hollow work carried by said work supporting member.

3. A lathe according to claim 1 wherein conveyor means carry said work to a loading position spaced from said transfer position and transfer means carry the work from said loading position to said transfer position where the work is received by said supporting member.

4. A lathe according to claim 3 wherein said transfer means comprises a horizontal beam mounted on a body pivotally supported on parallel crank arms rotatable about parallel horizontal axes to provide transverse lifting movement of the work.

5. A lathe according to claim 4 wherein a work support is provided between said loading position and said transfer position at an intermediate supporting position for holding work and said horizontal beam extends beneath said support to move more than one piece of work at a time from one position to another.

6. A lathe according to claim 3 wherein a loading conveyor feeds work to said loading position and feeding means on said conveyor move one piece of work at a time into said loading position in response to movement of another piece of work out of said position.

7. A lathe according to claim 1 wherein completely machined work is ejected from said transfer position by moving said work supporting member upward from a supporting position to an ejection position to roll the work out of said supporting member.

8. A lathe according to claim 7 wherein work is ejected onto a support at a hold position adjacent said lathe and lifting means are rotatably supported on said shaft for rotation therewith and engagement with the work in the hold position upon downward movement of said supporting members to lift work out of the hold position.

9. A lathe according to claim 1 wherein said work supporting member comprises arms extending radially from said shaft.

* * * * *